(12) United States Patent
Laresgoiti et al.

(10) Patent No.: US 7,611,796 B2
(45) Date of Patent: Nov. 3, 2009

(54) SOLID-OXIDE FUEL CELL WITH FERRITIC SUPPORT

(75) Inventors: Ander Laresgoiti, Iurreta (ES); Lide Rodriguez, Bilbao (ES); Igor Villarreal, Vitoria (ES)

(73) Assignee: Ikerlan, S. Coop, Mondragon (ES)

( * ) Notice: Subject to any disclaimer, the term of this patent is extended or adjusted under 35 U.S.C. 154(b) by 141 days.

(21) Appl. No.: 11/516,986

(22) Filed: Sep. 7, 2006

(65) Prior Publication Data
US 2007/0072057 A1 Mar. 29, 2007

(30) Foreign Application Priority Data
Sep. 27, 2005 (ES) ............... 200502329

(51) Int. Cl.
*H01M 4/00* (2006.01)
(52) U.S. Cl. .......................... 429/44; 429/30
(58) Field of Classification Search ................ 429/44, 429/30, 33, 46
See application file for complete search history.

(56) References Cited

U.S. PATENT DOCUMENTS

| | | | |
|---|---|---|---|
| 7,297,436 B2* | 11/2007 | Hori | 429/44 |
| 2002/0048699 A1 | 4/2002 | Steele et al. | |
| 2007/0009784 A1* | 1/2007 | Pal et al. | 429/30 |

FOREIGN PATENT DOCUMENTS

| | | |
|---|---|---|
| EP | 546714 A1 | 6/1993 |
| EP | 546714 B1 | 8/1999 |
| EP | 1263067 A2 | 12/2002 |
| JP | 07153469 A | 6/1995 |
| WO | 0022689 A1 | 4/2000 |
| WO | 2005122300 A2 | 12/2005 |
| WO | 2006082057 A2 | 8/2006 |

OTHER PUBLICATIONS

European Patent Office, Extended European Search Report, Dec. 5, 2006, Munich.
Balazs G. Bryan, et al, Ac Impedance Studies of Rare Earth Oxide Doped Ceria, Solid State Ionics, 1995, v. 76 pp. 155-162, Elsevier Science B.V.
Pratihar S.K, Solid Oxide Fuel Cells, Research Signpost 37/661(2); Applied Physics in the 21st Century, 2008, 73-108, pp. 9-10, archieved in http://dspace.nitrkl.ac.in/dspace.
Stefanik, Electrical Properties and Defect Structure of Praseodymium-Cerium Oxide Solid Solutions, Submitted to the Department of Materials Science and Engineering in Partial Fulfillment of the Requirements for the Degree of Doctor of Philosophy in Ceramics, Feb. 2004, © Massachusetts Institute of Technology, pp. 13-21.

* cited by examiner

*Primary Examiner*—Laura S Weiner
(74) *Attorney, Agent, or Firm*—Tim L. Kitchen; Peter B. Scull; Berenbaum Weinshienk PC

(57) ABSTRACT

Cell of a solid-oxide fuel cell that comprises a ferritic support (2), a first electrode (3) deposited on said ferritic support, an electrolyte (4) deposited on said first electrode (3), and a second electrode (5) deposited on said electrolyte (4). The cell comprises, between the first electrode (3) and the ferritic support (2), a diffusion barrier (6) that comprises cerium oxide.

13 Claims, 1 Drawing Sheet

SOLID-OXIDE FUEL CELL WITH FERRITIC SUPPORT

TECHNICAL FIELD

The present invention relates to solid-oxide fuel cells, and more specifically, to solid-oxide fuel cells that comprise a ferritic support.

PRIOR ART

Known solid-oxide fuel cells comprise a first electrode that acts as an anode, a second electrode that acts as a cathode and an electrolyte. Depending on the support used in these cells, there are cathodic support cells, anodic support cells and electrolyte support cells. There are also cells that comprise a metallic support.

U.S. Pat. No. 6,794,075 describes a solid-oxide fuel cell with a metallic support, more specifically a stainless steel ferritic support. It discloses a solid-oxide fuel cell with an intermediate temperature, its working temperature being around 500° C. The sintering process of this type of cell takes place at temperatures no higher than 1000° C.

In the solid-oxide fuel cells are used fuels such as natural gas, liquefied petroleum gas and diesel. In order to be used in this type of cell, said fuels must be converted by a reforming process into a mixture that comprises hydrogen, carbon monoxide and dioxide, and water. These reforming processes require high temperatures (from 600° C. to 900° C.).

DISCLOSURE OF THE INVENTION

It is an object of this invention to provide a solid-oxide fuel cell that comprises a metallic support, and which has a sufficiently low working temperature to prevent oxidation problems in the metallic support, and sufficiently high to have a sufficient thermal level to produce reformed gas with the minimum external heat contribution.

The inventive fuel cell thus comprises a metallic support, more specifically a ferritic support, a first electrode deposited on said ferritic support, an electrolyte deposited on said first electrode, and a second electrode deposited on said electrolyte. The inventive fuel cell also comprises, between the first electrode and the ferritic support, a diffusion barrier that comprises cerium oxide.

The inventive fuel cell must have a sintering temperature of over 1100° C. in order to densify the electrolyte, and the sintering atmosphere must be reductive or inert. If the diffusion barrier of cerium oxide is not used, at said temperatures the chrome and iron of the ferritic support will melt the first electrode, seriously affecting the stability and the catalytic activity of said first electrode.

The cerium oxide barrier prevents the diffusion of chrome and iron and also has the following characteristics:

It is a porous material and thus allows gas to pass through it.

It has a high electrical conductivity.

It has a thermal expansion coefficient similar to the thermal expansion coefficient of the ferritic support, the first electrode and the electrolyte.

It has a chemical compatibility with the ferritic support and the first electrode, which normally comprises Ni—YSZ or an equivalent material such as Ni—SsZ, Ni—YDC or Ni—SDC.

Therefore, the inventive fuel cell comprises a metallic support instead of a ceramic support, thereby reducing costs, and it also has a working temperature that is sufficiently high to prevent the need for additional heating means to reform the fuel, and all this without diffusion problems being created during the sintering process.

These and other advantages and characteristics of the invention will be made evident in the light of the drawing and the detailed description thereof.

DETAILED DISCLOSURE OF THE INVENTION

Figure 1:
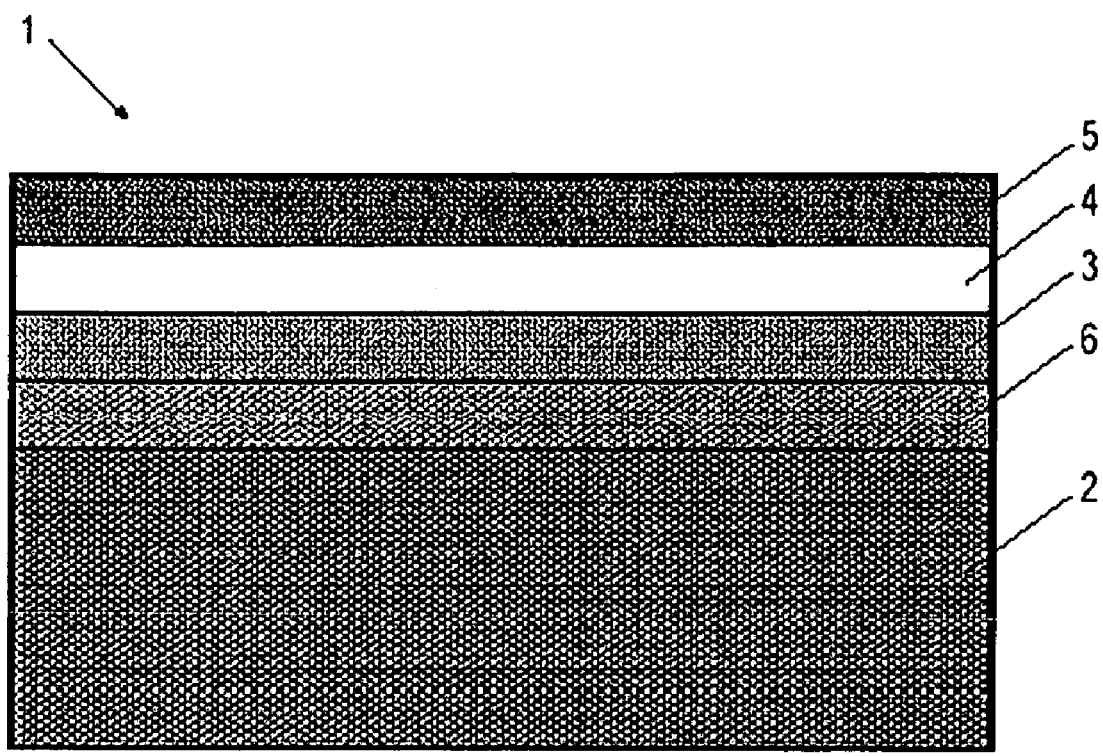
FIG. 1 is a cross-section of the inventive solid-oxide fuel cell.

As shown in FIG. 1, the inventive solid-oxide fuel cell 1 comprises a ferritic support 2, a first electrode 3 deposited on said ferritic support, an electrolyte 4 deposited on said first electrode 3, and a second electrode 5 deposited on said electrolyte 4. The cell 1 also comprises, between the first electrode 3 and the ferritic support 2, a diffusion barrier 6 that comprises cerium oxide.

In an inventive embodiment, the first electrode 3 is the anode and the second electrode 5 is the cathode. In a preferred embodiment, said first electrode 3 comprises Ni-YSZ and the electrolyte 4 comprises YSZ. The ferritic support 2 must have a thermal expansion coefficient similar to the thermal expansion coefficient of the electrolyte 4, which comprises YSZ in this case, said ferritic support 2 having a percentage of chrome of between 16% and 30% in weight. The thickness of said ferritic support 2 must be preferably comprised between 100 micron and 1 millimetre, and must have a porosity of between 20% and 55%.

During the cell manufacturing process, on said ferritic support 2, to which the diffusion barrier 6 has previously been added, is deposited NiO—YSZ with a percentage of NiO of between 30% and 60% in volume, preferably of around 50%, and with a final porosity of between 20% and 50%. The thickness of the resulting electrode 3 can vary between 5 and 30 micron. On said electrode 3 is deposited the electrolyte, the thickness of which may vary between 5 and 20 micron, being preferably 10 micron. During the sintering process, which is performed in a reductive or inert atmosphere, the NiO—YSZ is converted into Ni—YSZ.

The electrode 3 of the inventive cell 1 may comprise, instead of Ni—YSZ, an equivalent material such as Ni—ScsZ, Ni—YDC or Ni—SDC. Similarly, electrolyte 4 may comprise, instead of YSZ, an equivalent material such as SsZ, YDC or SDC.

In a first embodiment of the invention, the diffusion barrier 6 comprises cerium oxide doped with rare earth elements. Preferably, the cerium oxide doped with rare earth elements comprises $Ce_{1-X}RE_XO_{2-X/2}$, where RE is a rare earth element and X may vary between 0.05 and 0.3. Said rare earth element is preferably Yttrium, Samarium or Gadolinium.

In a second embodiment of the invention, the cerium oxide of the diffusion barrier 6 is not doped with rare earth elements, said diffusion barrier 6 comprising cerium oxide.

The thickness of the diffusion barrier of cerium oxide is comprised between 1 micron and 20 micron. In a preferred embodiment said thickness is approximately 5 micron.

What is claimed is:

1. A solid-oxide fuel cell comprising:
   a ferritic support,
   a diffusion barrier containing ceria doped with one or more rare earth elements deposited on the ferritic support,
   a first electrode deposited on said diffusion barrier,
   an electrolyte deposited on said first electrode, and a second electrode deposited on said electrolyte,
wherein the first electrode is an anode and the second electrode is a cathode.

2. A fuel cell according to claim 1 wherein the ceria doped with one or more rare earth elements comprises $Ce_{1-x}RE_xO_{2-x/2}$, where RE is a rare earth element and X may vary between 0.05 and 0.3.

3. A fuel cell according to claim 2 wherein the rare earth element comprises Yttrium, Samarium or Gadolinium.

4. A fuel cell according to claim 1 wherein the diffusion barrier has a thickness of between 1 micron and 20 microns.

5. A fuel cell according to claim 4 wherein the diffusion barrier has a thickness of approximately 5 microns.

6. A fuel cell according to claim 1 wherein the electrolyte has a thickness of between 5 microns and 20 microns.

7. A fuel cell according to claim 1 wherein the thermal expansion coefficient of the ferritic support is similar to the thermal expansion coefficient of the electrolyte.

8. A fuel cell according to claim 1 wherein the ferritic support comprises between 16% and 30% by weight chrome.

9. A fuel cell according to claim 1 wherein the ferritic support has a thickness of between 100 microns and 1 millimeter.

10. A fuel cell according to claim 1 wherein the ferritic support has a porosity of between 20% and 55%.

11. A solid-oxide fuel cell comprising:
a ferritic support having a thickness of between 100 microns and 1 millimeter, having 16% to 30% by weight chrome and having a porosity of between 20% and 55%,
a diffusion barrier containing ceria doped with one or more rare earth elements deposited on the ferritic support and having a thickness between 1 micron and 20 microns,
a first electrode deposited on said diffusion barrier, an electrolyte deposited on said first electrode having a thickness between 5 microns and 20 microns, the thermal expansion coefficient of the ferritic support being similar to the thermal expansion coefficient of the electrolyte; and
a second electrode deposited on said electrolyte;
wherein the first electrode is an anode and the second electrode is a cathode.

12. A fuel cell according to claim 11 wherein the ceria doped with one or more rare earth elements comprises $Ce_{1-x}RE_xO_{2-x/2}$, where RE is a rare earth element and x may vary between 0.05 and 0.3.

13. A fuel cell according to claim 12 wherein the rare earth element comprises Yttrium, Samarium or Gadolinium.

* * * * *